United States Patent
Don et al.

(10) Patent No.: US 6,839,804 B2
(45) Date of Patent: *Jan. 4, 2005

(54) DISK ARRAY STORAGE DEVICE WITH MEANS FOR ENHANCING HOST APPLICATION PERFORMANCE USING TASK PRIORITIES

(75) Inventors: Arieh Don, Brookline, MA (US); Natan Vishlitzky, Brookline, MA (US); Alexandr Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/679,810

(22) Filed: Oct. 6, 2003

(65) Prior Publication Data

US 2004/0078520 A1 Apr. 22, 2004

Related U.S. Application Data

(63) Continuation of application No. 09/541,158, filed on Mar. 31, 2000, now Pat. No. 6,633,954.

(51) Int. Cl.[7] .............................................. G06F 12/00
(52) U.S. Cl. ........................ 711/114; 711/147; 711/155; 711/158; 710/6; 710/54
(58) Field of Search ................................. 711/114, 147, 711/155, 158; 710/6, 54

(56) References Cited

U.S. PATENT DOCUMENTS

| 4,435,752 | A | 3/1984 | Winkelman |
|---|---|---|---|
| 4,604,694 | A | 8/1986 | Hough |
| 5,937,205 | A | 8/1999 | Mattson et al. |
| 6,009,484 | A | 12/1999 | Miller |
| 6,189,079 | B1 | 2/2001 | Micka et al. |
| 6,243,778 | B1 | 6/2001 | Fung et al. |
| 6,321,308 | B1 | 11/2001 | Arnon et al. |
| 6,633,954 | B1 * | 10/2003 | Don et al. ................ 711/114 |

* cited by examiner

*Primary Examiner*—Stephen Elmore
(74) *Attorney, Agent, or Firm*—George A. Herbster

(57) ABSTRACT

Disk array storage device apparatus for enhancing the performance of an application on a data processing system that operates with a disk array storage device in which the completion of tasks associated with different transactions with one logical storage device are conditions precedent to the completion of other transactions. Specific tasks related to the one logical device are given priority over tasks related to all other logical storage devices. In a specific implementation reconnect tasks are given the highest priority with reconnect tasks from the one logical storage device being given the highest priority. A second category of tasks related to the one logical storage device can be given priority over all other tasks except reconnect tasks. All other tasks are given a priority below that of the first and second task categories.

22 Claims, 4 Drawing Sheets

DISK ARRAY STORAGE DEVICE WITH MEANS FOR ENHANCING HOST APPLICATION PERFORMANCE USING TASK PRIORITIES

CROSS REFERENCE TO RELATED APPLICATION

This application is a continuation of U.S. patent application Ser. No. 09/541,158 filed Mar. 31, 2000 now U.S. Pat. No. 6,633,954 issued Oct. 14, 2003 entitled Method for Enhancing Host Application Performance with a DASD Using Task Priorities.

BACKGROUND OF THE INVENTION

1. Field of the Invention

This invention is generally related to digital data processing systems and more specifically to the enhancement of the performance of certain host application using a disk array storage device.

2. Description of Related Art

A disk array storage device (DASD) provides large quantities of storage, now in the terabyte range for digital processing systems. These disk array storage devices comprise many physical disk drives arranged into logical volumes or logical storage devices. Significant efforts have been undertaken and are underway to improve the overall performance and responsiveness of such disk array storage devices to various applications that a digital data processing system performs.

One application class has emerged that puts a particular strain on the resources in a disk array storage device with a consequential reduction in host application performance. Such performance reduction reflects in the interaction of the application with users. Generally speaking this class of application is characterized by requiring a logical storage device to record, as a condition precedent to the completion of a transaction, information related to that transaction.

An e-mail server is one example of such host applications. Assume an author or sender sends a message to a list of recipients. Some e-mail servers respond by producing a write transaction to the mailbox for each recipient and to other locations, such as a "sent" file or folder. Each write transaction involves multiple transfers with a storage facility, like a disk array storage device. For example, the e-mail server in some e-mail systems writes a log entry for each write transaction directed to a recipient in the e-mail data base and for other transactions. Each log entry identifies the sender, the mailbox address for the recipient and the source of the message. In some e-mail systems this log entry is a first of two log entries and indicates that data is to be written to the specified location. After the log entry is successfully completed, the server copies the message reading it from its source and writing to the recipient's mailbox. When that transfer is successfully completed, the server produces another log entry as a second entry. The log entries for the transactions are important in the case of a system failure. In that situation, the log file containing all the log entries can be analyzed to determine which previous e-mail messages have been written successfully and resend any messages that do not have both log entries.

A single dedicated logical storage device, that may reside on one or more physical disk drives normally stores all the log entries for the e-mail server. Also each mailbox in a disk array storage device may either reside on its own logical storage device or reside with other mailboxes on a logical storage device. In such applications, the connection between the server and the disk array storage device is usually a shared resource, such as a resource that includes a SCSI interface. Once the transaction to write the log device is sent, the disk array storage device and server are essentially disconnected until the log device completes recording the log entry. Then the log device reconnects so that the host application can complete the transaction or continue to perform added task functions. Such a disconnection and reconnection also occurs with write transfers and certain other transactions.

In e-mail systems with many users, writing entries to the log device can produce a bottleneck particularly when a single e-mail message is written to a large number of recipients on an e-mail list so that a large number of write operations are directed to the log device. Response times increase and can become evident in the form of prolonged response times for the user of the host applications.

SUMMARY

Therefore it is an object of this invention to provide an operating mode for a disk array storage device that enhances the operation of host applications in which a significant number of write transactions are directed to a single logical storage device.

Another object of this invention is to provide a disk array storage device that enables an enhanced performance of an e-mail or other like host application.

Still another object of this invention is to provide a disk array storage device with improved performance for handling applications in which the completion of a write transaction to a logical volume acts as a control with respect to other transactions and tasks.

In accordance with this invention a disk array storage device processes transactions with multiple tasks of different categories performed in the multiple logical storage devices according to the position of task requests in a task queue. One logical storage device is assigned priority. Upon receiving a task request from any of the logical storage devices, this method determines the task category and logical storage device related to the task request. If the task request is for a task in a first category, it is assigned to the task queue in a position having a first priority. If the task request corresponds to a task in a second category, the task request transfers to the task queue in a position having a second, lesser priority. All other task requests are transferred to the task queue at positions of a third priority that is less than the second priority.

In accordance with another aspect of this invention, the operation of a disk array storage device that processes transactions using multiple tasks of first and second categories performed in multiple logical storage devices is improved according to a method in which priority is assigned to one logical storage device. When a task request is generated for any logical storage device, its task category and the logical storage device to which it is related are determined. Task requests in the first category from the other logical storage devices transfer to positions in the task queue of a first general priority. A task request of the first category related to the one logical storage device transfers to the highest priority position in the task queue. Other task requests transfer to positions that have a priority that is less than the first priority.

In accordance with another aspect of this invention, the performance of an e-mail application program operating in a data processing system with a host processor and a disk array storage device is enhanced. The disk array storage device includes logical storage devices that operate in response to tasks including reconnect tasks and second and third categories of other tasks. One logical storage device is dedicated to store a log. In accordance with this method, a task queue is maintained for different task requests that schedule the order by which the tasks are completed within the disk array storage device. Upon receiving a task request related to any of the logical storage devices, the method initially determines the task category and the logical storage device related to the task request. A reconnect task request related to a logical storage device other than the dedicated logical storage device transfers to a position in the task queue of a first priority. A reconnect task request related to the dedicated logical storage device transfers to a position in the task queue having the highest priority. Requests for tasks of the second category related to the dedicated logical storage device transfer to positions in the task queue of a second priority that is less than the first priority. Requests for any other tasks from the logical storage devices transfer to positions of a priority that is less than the second priority.

In accordance with another aspect of this invention the performance of an e-mail application operating in a data processing system of the host processor in a disk array storage device is improved. The disk array storage device comprises a plurality of logical storage devices that operate in response to tasks including reconnect tasks generated when a logical storage device completes a task, a second category of tasks generated in response to certain activities within the disk array storage device and a third category of other tasks. In the e-mail system each e-mail the creation of each new e-mail message will require a log entry in a dedicated logical storage device as a condition precedent to the processing of any transaction. In accordance with the method a first-in and first-out task queue is maintained for different task requests and schedules the order by which the corresponding tasks are completed within the disk array storage device. The system operates by normally adding reconnect tasks at the beginning of the queue and other tasks to the end of the task queue. However, in an e-mail system the system transfers reconnect tasks related to the dedicated logical storage device to the head of the task queue whereby reconnect tasks related to other logical storage devices are transferred to a location following a reconnect task in the queue related to the dedicated logical storage device. Task requests of the second category related to the dedicated logical storage device transfer to a position in the task queue that follows any reconnect task requests in the task queue.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
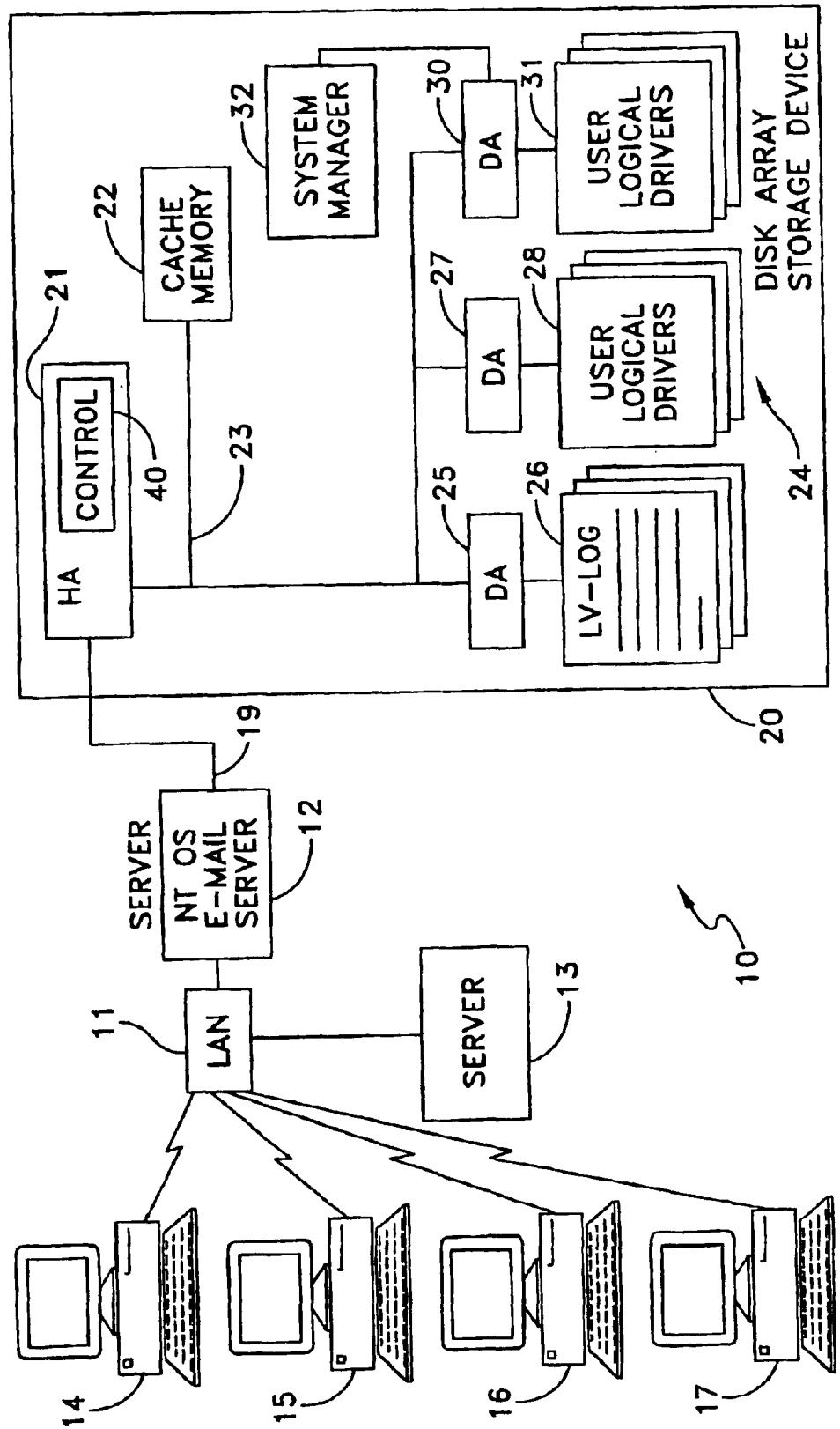
FIG. 1 depicts a network including a disk array storage device incorporating this invention.

FIG. 1 depicts a computer network 10 in which a number of users have e-mail capabilities. More specifically, the network 10 includes a representative hub 11 that connects to multiple servers 12 and 13 although any number of servers could be incorporated in the network. In this particular embodiment, the server 12 is an Exchange server running on the NT operating system. Representative workstations 14, 15, 16 and 17 connect to the hub 11 for access to the servers 12 and 13. The workstations 14 through 17 are merely representative; in fact the number of workstations attached to the network could number in the thousands.

A bus 19, typically with a SCSI interface, connects the server 12 to a disk array storage device 20. For purposes of explaining this invention, this disclosure describes a Symmetrix disk array storage device sold by the assignee of this application. FIG. 1 depicts a general configuration of the disk array storage device as including a host adapter (HA) 21 and a cache memory 22 connected over a bus 23. A disk array also connects to the bus 24 and includes a number of disk adapters and physical disk drives. FIG. 1 depicts, in particular, a disk adapter (DA) 25 with a plurality of physical disk drives 26, a disk adapter (DA) 27 with a plurality of physical disk drives 28 and a disk adapter (DA) 30 with a plurality of physical disk drives 31. A system manager 32 connects through one of the disk adapters, such as the disk adapter 30, for controlling the configuration of the disk array storage device 20, all as known in the art. Each of the adapters, such as the host adapter 21 and disk adapters 25, 27 and 30, operates under the control of a microprocessor based system.

As known, the physical disk drives in the array 24 are also organized as logical storage devices. In the Exchange e-mail application, that serves as a basis for the description of this invention, one such logical storage device is dedicated as a log device and is designated as the LV-LOG device in FIG. 1. Other logical storage devices are assigned to be mailboxes for individual recipients. FIG. 1 depicts a local e-mail system in which all mailboxes are located in a local disk array storage device 20. Pathways to other databases including remote databases by various known means are also possible. Such multiple database e-mail systems will also benefit from the performance enhancement that this invention provides.

The disk array storage system 20 is a task-based system. That is, in response to any command received by the host adapter 21, a microprocessor based control 40 in the host adapter 21 responds by producing a command sequence and various operations that require various tasks in specific sequences. Each sequence places an identification of the task and the identity of the logical storage device to be involved with task on a task request queue. Each entry in the task request queue therefore constitutes a task identifier and serves as a task request. We use "task request" in this description. Three specific tasks of a disk array storage device 20 shown in FIG. 1 are important to understanding of this invention. They are:

1. A reconnect task. When a host device, such as the server 12 in FIG. 1, writes to a logical storage device, such as the LV-LOG device 26, it sends a command with all the necessary information from the host device and then disconnects as quickly as possible. When completed, the disk array storage device attempts to reestablish a path to the host device. If it is not successful, it issues a reconnect task request;

2. A Start Command task. As a sequence related to a specific command terminates, it determines whether another command is present in a start command queue assigned to that specific logical storage device. If such a command is present but can not be started for any reason, a start command task request issues; and 3. A WP Ceiling task. Each logical storage device in the disk array storage device has allocated a maximum number of write-pending slots in the cache memory 22. Each time a sequence in response to a command issues a write request, a test is made. If the write operation will cause the number of write pending slots in use by the logical storage device to exceed the assigned maximum, a WP Ceiling task request is generated.

Figure 2:
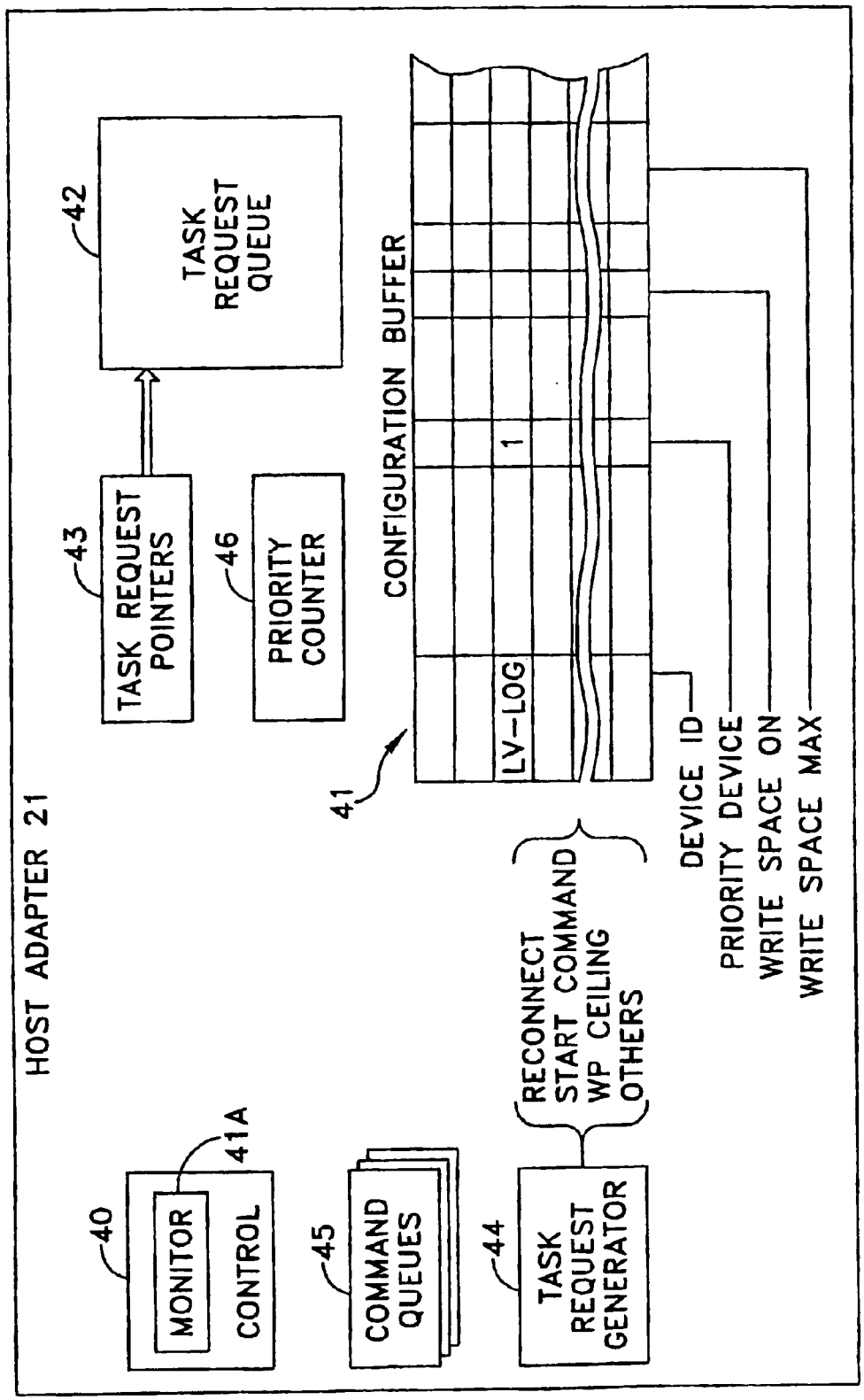
FIG. 2 is a block diagram of portions of host adapter shown in FIG. 1.

While any one or more of these task requests may be generated each time a command is processed, it is characteristic of a writing operation to the log device, such as the LV-LOG logical storage device in FIG. 2, that all three of those tasks will be produced in response to each write transaction to a mailbox and other transactions that require a log entry.

Referring to FIG. 2, the host adapter 21 has access to a configuration buffer 41 with an entry for each logical storage device. The configuration buffer 41 may be located within the host adapter 21 or within the cache memory 22. Each entry has a number of information items pertaining to a particular logical device, such as a logical storage device identification (ID), a PRIORITY DEVICE flag, a WRITE SPACE ON flag and a WRITE SPACE MAX field. The PRIORITY DEVICE flag identifies the one logical storage device that is to be given priority over all other logical storage devices. In this particular embodiment, the LV-LOG logical storage device is the device that is given priority so its corresponding PRIORITY DEVICE flag is set. The method of setting a flag in a configuration buffer or other buffer is well known in the art. Setting the PRIORITY DEVICE flag in the configuration buffer 41 for the LV-LOG logical storage device constitutes assigning priority to one of the logical storage devices. The function of the WRITE SPACE ON flag is set forth more clearly later. However, typically the WRITE SPACE ON flag will be set only if the corresponding PRIORITY DEVICE flag is set.

FIG. 2 further depicts a monitor module 41A in the control 40. This monitor module 41A takes the form of a program that operates in the control 40 to determine whether any task requests are pending for any logical storage devices or other devices in the configuration buffer 41. When a task request exists, the monitor module 41A places it on a task request queue 42 at a position identified by a task request pointer 43. FIG. 2 also depicts a task request generator 44 that represents the means by which various task requests are generated. Although shown as a discrete module, it will be apparent that such a module will be implemented in software. FIG. 2 also depicts a plurality of command queues 45. Each command queue receives commands from the host processor directed to a corresponding logical storage device. The function of a priority counter 46 is described later.

Figure 3A:
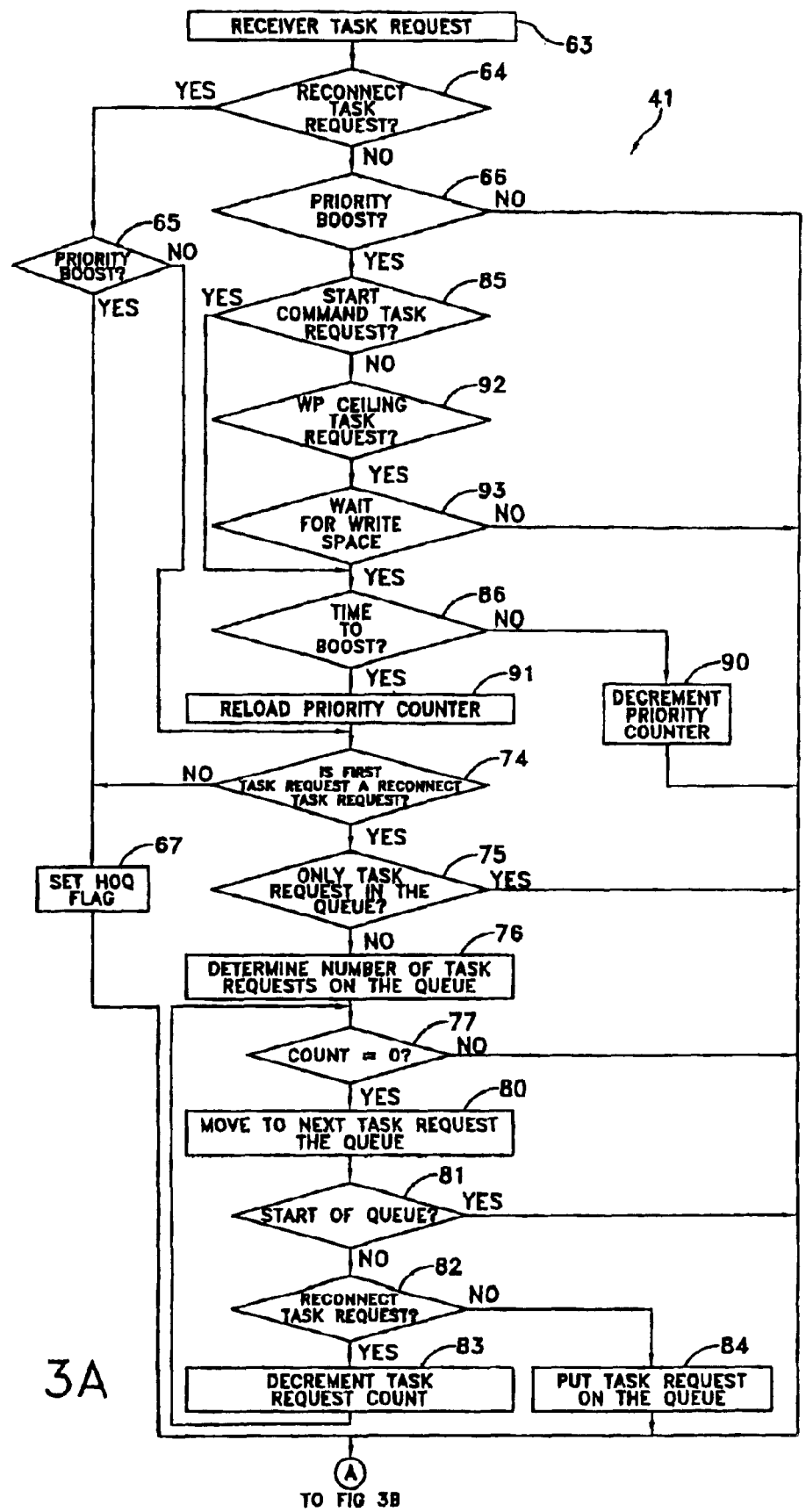
FIGS. 3A and 3B constitute a flow chart of operations within the host adapter of FIG. 2 to implement this invention.
Figure 3B:
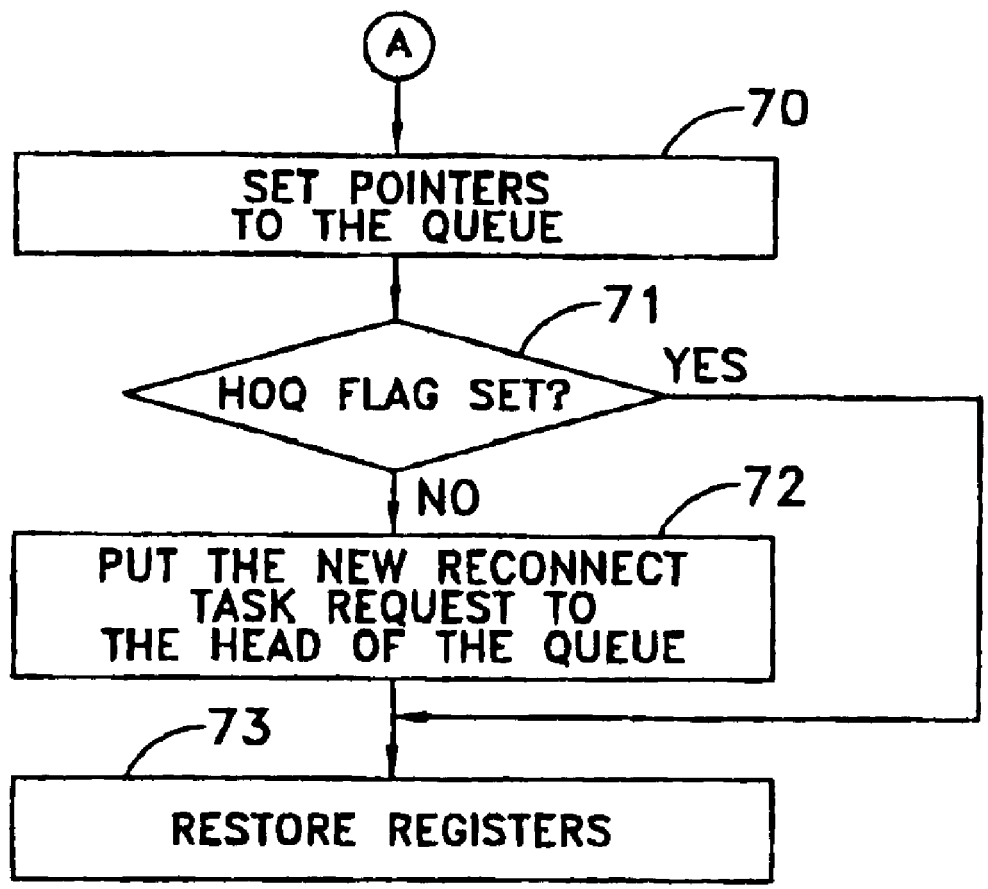

FIGS. 3A and 3B depict the operation of the monitor module 41A in response to the receipt of a task request at step 63. A series of steps 64, 65 and 66 provide a decoding function by determining the category of the requested task and the logical storage device with which it is related. In accordance with this invention, one of the logical devices is designated as a priority device. To enhance the operation of an e-mail system, the log file logical storage device, such as the LV-LOG logical storage device 26 in FIG. 1, is given priority.

Reconnect task requests constitute a first category of task requests. In a disk array storage device as available from the assignee of this invention, reconnect tasks are always placed at the top of the task request queue 42 and positioned at a first or highest priority. In accordance with this invention, however, a distinction is made between those reconnect tasks from the priority device and those reconnect tasks from all other devices. If the reconnect task is related to a priority device, such as the LV-LOG logical storage device, steps 64 and 65 direct control to step 67 that sets an HOQ flag. Control then transfers to step 70 in FIG. 3B that sets various pointers 43 to the task request queue 42. If the HOQ flag is set, as it is when the reconnect task request relates to a priority device, step 71 transfers control to step 72 that places this reconnect task request at the head of the task request queue 42, i.e., at the position of highest priority. Then the monitor module 41A performs various housekeeping operations in step 73 to restore any registers. Thus, any time the host adapter 21 in FIG. 1 recognizes a reconnect task request from a priority device, it enables the corresponding reconnect task to be processed as a next task in sequence.

If the reconnect task is from a non-priority device, control passes from step 65 in FIG. 3A to step 74 to begin a sequence that places a task in an appropriate position in the task request queue 42. As previously indicated, reconnect tasks generally have a high priority. Consequently a reconnect task from any non-priority device is still placed near the head of the task request queue. Specifically, step 74 determines if the first task request in the task queue is a reconnect task request. If it is not, then control passes back to the step 67 and this reconnect task request is placed at the head of the queue just as if it had come from the priority device.

Step 74 then transfers control to a series of steps that analyze the task request queue 42 to determine an appropriate location for this priority task from a non-priority device dependent upon some independent operating condition, such as the number of task requests in the task request queue 42 in FIG. 2. For this specific independent operating condition step 75 determines whether there are any other tasks in the queue. If the non-priority device reconnect task request being processed will be the only entry in the task request queue 42, control passes directly to step 70 in FIG. 3B to place the task request on the task request queue 42. As it is the only task request, it will be the next task handled and, as it is a reconnect task request, if any other task requests arrive they will, with the exception of a reconnect task request from the priority device, be placed on the task request queue 42 after this task request.

If the task request queue 42 contains task requests, step 75 transfers control to step 76 in FIG. 3A that determines the total number of task requests on the task request queue 42. Initially the number is greater than zero, so step 77 transfers control to step 80 that moves the task request pointers 43 to a next task on the task request queue 42. If this transfer causes the task request pointers 43 to go back to the start of the task request queue 42, step 81 transfers control to step 70 in FIG. 3B. Otherwise, step 82 determines whether the task in the location identified by the count is a reconnect task. If it is, step 83 decrements the task count and control transfers back to step 77. If a task request is received and all the tasks on the task request queue are reconnect tasks, control passes from step 77 to step 70 to load the task request at the end of the queue. Thus, these steps transfer reconnect task requests related to the dedicated logical storage device to the head of the task queue whereby reconnect task requests related to other logical storage devices are transferred to a location following any reconnect task request related to the dedicated logical storage device.

If, on the other hand, there is a mix of reconnect and other requests, step 82 eventually branches to step 84 that places the task request in the task request queue 42 at the first position following any reconnect task connect. Thus, the foregoing process assures that any reconnect task request from the priority or any non-priority device remains at a high priority overall.

Task requests such as the Start Command task request and WP Ceiling task requests constitute a second task category. These tasks are given priority over other tasks, except reconnect tasks, but only if they are associated with the priority device and only if other particular conditions are met. Other tasks could also be included with appropriate conditions for other applications.

Looking first at a Start Command task request, steps 64 and 66 transfer control to step 85 that decodes the command and transfers control to step 86. Step 86 then monitors for the existence of a condition or completion of a control function as a condition precedent to any increase the priority of the Start Command task request from the priority device. In FIG. 3A the control function for this monitoring step 86 is represented as a "time to boost" test, and it uses the contents of the priority counter 46 shown in FIG. 2. The priority counter 46 controls the percentage of secondary category task requests from the priority device for which priority will be increased. That is, the priority counter 46 tracks the number of secondary category transfers from the dedicated logical storage device. The percentage is a function of the reciprocal of the number in the priority counter 46. That is, if every second category command task request should be given priority, the priority counter 87 receives a "1". If 25% of the task requests are to receive priority, the priority counter receives "4". Whenever the value in the priority counter 46 is greater than 1, step 86 transfers to step 90 to decrement the counter and thereby load the Start Command task request at the bottom of the task request queue 42. When the priority counter 87 reaches a 1, however, control passes from step 86 to step 91 that reloads the priority counter with its initial number and thereafter enters the procedure beginning with step 74 to place the Start Command task request in the task request queue in locations of a second priority just following any reconnect tasks.

As will now be apparent, if step 91 reloads the priority counter 46 with "1" the priority of all the second category tasks related to the priority device are enhanced. If the value is "2", 50% are enhanced. The number in the priority counter 46 will normally be "1" so that to enhance the priority of all second category requests from the priority device. However, the priority counter 46 provides a means for preventing these tasks from excluding tasks from other logical storage devices to assure even system performance.

A similar procedure monitors another condition as a condition precedent for increasing the priority of a WP Ceiling task request for the priority device. Steps 64, 66 and 85 transfer control to step 92 that enables a priority change for write space task requests related to the dedicated logical storage device by shifting control to step 93 to determine whether the sequence should wait for write space. This depends upon the setting of a flag, such as the WRITE SPACE ON flag, shown in FIG. 2. As previously indicated, the WRITE SPACE ON flag will generally be set only for a priority device. In the flow diagram of FIG. 3A, the test of step 93 is not applied to non-priority devices. If the WRITE SPACE ON flag is set, step 93 is enabled to shift control to step 86. Otherwise the WP Ceiling task request is inserted at the end of the task request queue 42.

Consequently, this process gives priority to second category task requests, such as the WP Ceiling and Start Command task requests, related to the priority device only if certain conditions are met. The "time to boost" test in step 86, applies collectively to Start Command and WP Ceiling task requests and is one condition precedent to increasing task request priority. In the specific case of a WP Ceiling Task request, the WRITE SPACE ON flag must be set as a condition precedent for a priority increase for that task request.

As will now be apparent, the priority device and other logical storage devices will only place one task request on the task request queue 42 at a time. However, certain task requests from the priority device will be taken up with enhanced priority by either being placed at, or transferred to, the top of the task request queue in the case of a reconnect task from the priority device or immediately following any reconnect tasks in the case of request of the second category such as the Start Command and WP Ceiling task requests. Otherwise all task requests from the priority device go to the bottom of the task request queue 42.

It has been found that such a method for increasing the priority of task requests in the first and second categories greatly enhances the efficiency of the logging operation involved with such e-mail systems and enhances the operation of the e-mail system. As a result the number of simultaneous users of the e-mail system increases over these that can be accommodated without the invention. The degree of increase depends in part on the selection of the initial value assignment to the priority counter 46 and on a decision of whether to set the determination whether the WRITE SPACE ON flag.

This invention has now been disclosed in terms of a specific embodiment involving an e-mail system. It will be apparent that many other variations could be incorporated. For example, the four-way decoder comprising steps 64, 65 and 66 decodes each task to determine whether it is a reconnect task and then determines whether the task is related to a priority device. This is shown by way of example for purposes of simplifying FIGS. 3A and 3B. The reverse approach of testing first to determine whether the task request is associated with a priority device and then determining the task is a reconnect task is actually used. Similarly, other sequences of tests could be incorporated while obtaining some or all of the advantages of this invention. In addition FIGS. 1 and 2 disclose a system with a single connection to a host and a single physical disk drive that stores a log file. Some disk array storage systems may include multiple paths or ports to different host systems or different host applications. If multiple ports exist, the priority device will be assigned only for transactions from a corresponding port. Also in some systems, the physical disk drives may be configured so that the priority device appears as a single logical storage device to the host application, even though log entries are stored on multiple physical disk drives. The foregoing description of an e-mail system assumes that the log device will be the only priority device accessible to host applications. In some other applications it may be desirable to identify multiple logical storage devices or other logical devices as priority devices for enhancing host application performance. Performance issues for a specific host application will dictate the identity of a priority device or priority devices and the identity of tasks for each category.

In whatever implementation of this invention what is important, however, is that this invention provides a means of eliminating a bottleneck in certain operations when a particular logical device in a disk array storage device becomes overloaded and in which completion of transactions in that device are a condition precedent to other actions. In accordance with this specific embodiment, reconnect, Start Command and WP Ceiling task requests are specifically given priority. Other tasks might be given priority in other systems that operate in different manners. Therefore, it is the intent of the appended claims to cover all such variations and modifications as come within the true spirit and scope of this invention.

What is claimed as new and desired to be secured by Letters Patent of the United States is:

1. A disk array storage device with a plurality of logical storage devices, the disk array storage device processing transactions with multiple tasks of different categories to be performed in different ones of the logical storage devices, said disk array storage device comprising:
   A) means for processing the tasks according to their respective positions of corresponding task requests in a task request queue,
   B) means for assigning priority to one of the logical storage devices, and
   C) means for receiving a task request from any of the logical storage devices including:
      i) category determining means for determining the task category and the logical storage device related to the task request,
      ii) first transfer means for transferring a task request of a first category to a position in the task request queue having a first priority,
      iii) second transfer means for transferring a task request of a second category related to the one logical storage device to a position in the task request queue having a second priority that is less than the first priority, and
      iv) third transfer means for transferring any other task request to a position in the task request queue of a third priority that is less than the second priority.

2. A disk array storage device as recited 1 wherein said first transfer means produces a transfer of a task request of the first category to the position in the task request queue having the highest priority if the task request is related to the one storage device.

3. A disk array storage device as recited in claim 2 wherein said second transfer means transfers task requests of the second category dependent upon an independent operating condition and said disk array storage device comprises means for establishing the independent operating condition.

4. A disk array storage device as recited in claim 3 wherein a start command task request is generated when a logical storage device completes processing a command and another command is in its command queue, said category determining means assigning the start command task request to the second category.

5. A disk array storage device as recited in claim 3 including a memory and wherein each logical storage device is allocated certain space in the memory whereby a write space task requested is generated each time a logical storage device attempts to use space in excess of the allocated space, said category determining means assigning a write space task request to the second category.

6. A disk array storage device as recited in claim 3 including a memory and each logical storage device is allocated certain space in the memory whereby a write space task request is generated each time a logical storage device attempts to use space in excess of the allocated space and wherein said data storage facility includes means for controlling the priority given to a write space task, said category determining assigning a write space task request to the second category and wherein said second category task transfer means transfers a write space task request related to the one logical storage device to a second priority position in the task queue in response to said priority controlling means.

7. A disk array storage device that processes transactions with multiple tasks of first and second categories performed in multiple logical storage devices, said disk array storage device comprising:
   A) means for processing the tasks according to the positions of corresponding task requests in a task request queue,
   B) means for assigning priority to one of the logical storage devices, and
   C) means for receiving a task request from any of the logical storage devices including:
      i) category determining means for determining the task category and the logical storage device related to the task,
      ii) first transfer means for transferring a task request of the first category related to the other storage devices to a position in the task request queue of a first priority,
      iii) second transfer means for transferring a task request of a first category related to the one storage device to a position in the task request queue having the highest priority, and
      iv) third transfer means for transferring any other task request to a position in the task request queue with a priority that is less than the first priority.

8. A disk array storage device as recited in claim 7 wherein the other tasks include tasks in second and third categories comprising means for transferring task requests for second category tasks to a position of a second priority in the task request queue that is less than the requests in the third category to a position in the task request queue that has a priority that is less than the first and second priorities.

9. A disk array storage device as recited in claim 8 wherein the disk array storage device has means for enabling and disabling a priority change, said first transfer means for transferring a first category task request related to the one logical storage device being permitted when priority changes are enabled.

10. A disk array storage device as recited in claim 8 wherein the completion of the processing of one command enables the generation of a start command task when another command is in a command queue, said category determining means assigning a start command task request to the second category.

11. A disk array storage device as recited in claim 8 wherein the disk array storage device includes a memory and wherein each logical storage device is allocated certain space in the memory whereby a write space task is generated each time a logical storage device attempts to use space in excess of its allocated space, said category determining means assigning a write space task as a task of the second category.

12. A disk array storage device as recited in claim 11 wherein the disk array storage device includes priority controlling means for controlling the priority given to a write space task, said category determining means assigning a write space task as a task of the second category and said third transfer means transfers to the write space task request related to the one logical storage device to a second priority position in the task request queue when said priority controlling means enables priority to be given.

13. A disk array storage device for improving the performance of an e-mail application program operating in a data processing system with a host processor, said disk array storage device including a plurality of logical storage devices and operating in response to tasks including reconnect tasks requested when a logical storage device completes a task, a second category of tasks requested in response to certain activities within the disk array storage device and a third category of other tasks and wherein each e-mail transaction requires the completion of a log entry in a dedicated logical storage device as a condition precedent to the processing of any transaction, said disk array storage device comprising:

A) means for maintaining a task request queue for different task requests that schedule the order by which tasks are completed within said disk array storage device, and B) means responsive to the receipt of a task request related to any of the logical storage devices including:
  i) means for determining the task category and the logical storage device related to the task,
  ii) first transfer means for transferring a reconnect task related to a logical storage device other than the dedicated logical storage device to a position in the task request queue of a first priority,
  iii) second transfer means for transferring a reconnect task request related to the dedicated logical storage device to that position in the task request queue having the highest priority,
  iv) third transfer means for transferring a task request of the second category related to the dedicated logical storage device to a position in the task request queue with a second priority that is less than the first priority, and
  v) fourth transfer means for transferring any other task request from the logical storage devices to a position in the task request queue with a priority that is less than the first priority and second priorities.

14. A disk array storage device as recited in claim 13 wherein one of the second category of tasks is a start command task that is requested when a logical storage device completes processing a command and another command is in its command queue, said third transfer means including:
  i) means for transferring a start command task request related to the dedicated logical storage device to a highest priority position in the second priorities, and
  ii) means for transferring start command task requests related to any other storage device to the end of the task request queue at the least priority.

15. A disk array storage device as recited in claim 13 wherein one of the second category of tasks is a write space task that is generated when storage in a cache memory for a given logical storage device exceeds a predetermined level, said third transfer means including:
  i) means for transferring a write space task related to the dedicated logical storage device to a highest priority position in the second priorities, and
  ii) means for transferring write space tasks related to the other logical storage devices to the end of the task request queue at the least priority.

16. A disk array storage device as recited in claim 15 wherein the second category of tasks additionally includes a start command task that is requested when a logical storage device completes processing a command and another command is in its command queue, said third transfer means including:
  i) means for transferring a start command task related to the dedicated logical storage device to a highest priority position in the second priorities, and
  ii) means for transferring start command tasks related to other logical storage devices to the end of the task request queue at the least priority.

17. A disk array storage device as recited in claim 13 additionally comprising means for establishing a second category transfer condition, said third transfer means making a tranfer only when the condition exists, said third transfer means otherwise transferring the task to the end of the task request queue.

18. A disk array storage device as recited in claim 17 wherein the second category transfer condition is a percentage of operations and said third transfer means includes means for tracking the number of second category transfers from the dedicated logical storage device.

19. A disk array storage device as recited in claim 18 wherein the second category of tasks includes a start command task that is requested when a logical storage device completes processing a command and another command is in its command queue and a write space task that is generated when storage in a cache memory for a given storage device exceeds a predetermined level, said second category number tracking means tracking both start command tasks and write space tasks related to the dedicated logical storage device for determining whether the condition is met.

20. A disk array storage device as recited in claim 19 additionally comprising means for establishing one of two operating states for processing write space tasks, said third transfer means transferring write space tasks related to the dedicated logical storage device to the end of the task request queue during one of the states and said second category number tracking means including means for tracking both start command tasks and those write space tasks that occur during the other of the operating states.

21. A disk array storage device for improving the performance of an e-mail application program operating in a data processing system with a host processor, said disk array storage device comprising a plurality of logical storage devices and operating in response to tasks including reconnect tasks generated when a logical storage device completes a task, a second category of tasks generated in response to certain activities within the disk array storage device and a third category of other tasks and wherein each e-mail transaction requires a log entry in a dedicated logical storage device as a condition precedent to the processing of any transaction, said disk array storage device comprising:

A) a first-in, first-out task request queue for different tasks that schedules the order by which tasks are completed within the disk array storage device, B) means for normally adding reconnect tasks to the beginning of the task request queue and other tasks to the end of the task request queue except for:

C) first transfer means for transferring reconnect tasks related to the dedicated logical storage device to the head of the task request queue whereby reconnect tasks related to other logical storage devices are transferred to a location following any reconnect task related to the dedicated logical storage device, and D) second transfer means for transferring a task request of the second category related to the dedicated logical storage device to a position in the task request queue that follows any reconnect task requests in the task request queue.

22. A disk array storage device as recited in claim 21 wherein the second category of tasks includes a start command task that is requested when a logical storage device completes processing a command and another command is in its command queue and a write space task that is generated when storage in a cache memory for a given storage device exceeds a predetermined level and wherein the disk array storage device includes enabling means for enabling a priority change for write space tasks related to the dedicated logical storage device and tracking means for tracking the occurrence of second category tasks related to the dedicated logical storage device, said second transfer means comprising:

i) means for transferring a write space task request related to the dedicated logical storage device to the end of the task request queue when the enabling means disables the write space task priority change, and ii) means for transferring, in response to the tracking means, a write space task request related to the dedicated logical storage device that exists when the enabling means enables the write space task priority change and a start command task request related to the dedicated logical storage device to a position following any reconnect task requests in the task request queue and otherwise transferring the second category task requests to the end of the task request queue.

\* \* \* \* \*